(12) United States Patent
Ryu et al.

(10) Patent No.: US 7,590,831 B2
(45) Date of Patent: Sep. 15, 2009

(54) LOOP ACCELERATOR AND DATA PROCESSING SYSTEM HAVING THE SAME

(75) Inventors: Soo-jung Ryu, Cheonan-si (KR); Jeong-wook Kim, Seongnam-si (KR); Suk-jin Kim, Seoul (KR); Hong-Seok Kim, Seongnam-si (KR); Jun-jin Kong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 11/514,889

(22) Filed: Sep. 5, 2006

(65) Prior Publication Data

US 2007/0157009 A1 Jul. 5, 2007

(30) Foreign Application Priority Data

Jan. 3, 2006 (KR) ............... 10-2006-0000703

(51) Int. Cl.
*G06F 9/44* (2006.01)
(52) U.S. Cl. ............................................... 712/241
(58) Field of Classification Search ............... 712/241
See application file for complete search history.

(56) References Cited

U.S. PATENT DOCUMENTS

| | | | | |
|---|---|---|---|---|
| 4,967,340 A * | 10/1990 | Dawes | ............... | 712/19 |
| 6,662,302 B1 * | 12/2003 | Garey | ............... | 713/324 |
| 6,745,317 B1 * | 6/2004 | Mirsky et al. | ............... | 712/11 |
| 7,126,214 B2 * | 10/2006 | Huppenthal et al. | ............... | 257/686 |
| 7,263,602 B2 * | 8/2007 | Schmit | ............... | 712/227 |
| 2005/0283743 A1 * | 12/2005 | Mulholland et al. | ............... | 716/1 |

* cited by examiner

*Primary Examiner*—Eddie P Chan
*Assistant Examiner*—Jacob Petranek
(74) *Attorney, Agent, or Firm*—Sughrue Mion, PLLC

(57) ABSTRACT

Provided are a loop accelerator and a data processing system having the loop accelerator. The data processing system includes a loop accelerator which executes a loop part of a program, a processor core which processes a remaining part of the program except the loop part, and a central register file which transmits data between the processor core and the loop accelerator. The loop accelerator includes a plurality of processing elements (PEs) each of which performs an operation on each word to execute the program, a configuration memory which stores configuration bits indicating operations, states, etc. of the PEs, and a plurality of context memories, installed in a column or row direction of the PEs, which transmit the configuration bits along a direction toward which the PEs are arrayed. Thus, a connection structure between the configuration memory and the PEs can be simplified to easily modify a structure of the loop accelerator so as to extend the loop accelerator.

13 Claims, 4 Drawing Sheets

LOOP ACCELERATOR AND DATA PROCESSING SYSTEM HAVING THE SAME

CROSS-REFERENCE TO RELATED APPLICATIONS

This application claims priority from Korean Patent Application No. 10-2006-0000703, filed Jan. 3, 2006, in the Korean Intellectual Property Office, the disclosure of which is incorporated herein by reference.

BACKGROUND OF THE INVENTION

1. Field of the Invention

Apparatuses and methods consistent with the present invention relate to a loop accelerator and a data processing system having the same, and more particularly, to a loop accelerator capable of simplifying a connection structure between a configuration memory and processing elements (PEs) so as to easily modify a structure thereof and save cost and a data processing system having the same.

2. Description of the Related Art

In general, a program includes a part that must be repeatedly executed with a predetermined routine. When a data processing system executes the program, an additional loop accelerator separately executes the predetermined routine in order to rapidly process the program.

FIG. 1 is a view illustrating a configuration of a conventional data processing system.

The conventional data processing system includes a processor core 1, a central register file 2, and a loop accelerator 3.

The processor core 1 processes the part of a program except a loop part of the program repeatedly executed, and the loop accelerator 3 processes the loop part. The processor core 1 and the loop accelerator 3 share the central register file 2, and the central register file 2 serves to transmit data between the processor core 1 and the loop accelerator 3.

The loop accelerator 3 includes an array part 5 and a configuration memory 4.

A plurality of PEs 6 are arrayed in the array part 5 so as to form a matrix. Each of the PEs 6 performs an operation on each word and includes a functional unit (FU) for processing data and a distributed register file (RF) storing operated values.

The configuration memory 4 stores configuration bits provided to the PEs 6 of the array part 5.

In the conventional data processing system, the configuration memory 4 is connected to the PEs 6 by wires so as to transmit the configuration bits from the configuration memory 4 to the PEs 6. Thus, the wires must be as long as a distance between the configuration memory 4 and the PEs 6 to transmit the configuration bits to one of the PEs 6 at the longest distance from the configuration memory 4.

Due to the length of the wires, designing an array of the wires is complicated, and cost increases. A cycle of a clock signal must be set based on the longest one of the wires. Thus, the cycle of the clock signal is long, and thus a speed of transmitting the configuration bits is decreased.

To solve these problems, an eXtreme processing platform (XPP) processor 10 having a configuration designed in a tree form is suggested so as to transmit configuration bits from a configuration memory to the PEs 6 as shown in FIG. 2.

The XPP processor 10 is based on a hierarchical coarse-grained array (CGA) and includes one or more processing array clusters (PACs) 20. Each of the PACs 20 includes a plurality of processing array elements (PAEs) 50 each performing an operation on each word, and the PAEs 50 are arrayed in a matrix form so as to form rectangular blocks.

The XPP processor 10 includes a supervising configuration manager (SCM) 5 and configuration managers (CMs) 40 to transmit the configuration bits from the configuration memory to the PACs 20. The SCM 5 receives the configuration bits from the configuration memory through an external interface, and the CMs 40 connect the PACs 20 to the SCM 5 to transmit the configuration bits from the configuration memory to the PACs 20.

The CMs 40 include random access memories (RAMs) 41 storing the configuration bits received from the SCM 5 and sub-configuration managers (SMs) 43 of the CMs 40 providing the configuration bits to the PAEs 50 of the PACs 20.

A plurality of horizontal bus lines 31 are arrayed in a lattice form in each of the PACs 20 to transmit the configuration bits to the PAEs 50 arrayed in the matrix, and vertical bus lines 35 cross intersecting points of lattices of the horizontal bus lines 31. Switches 33 are installed between the intersecting points of horizontal bus lines of the horizontal bus lines 31 arrayed in one direction. The configuration bits are transmitted from the CMs 40 to the PAEs 50 through a configuration bus 37.

The PAEs 50 include arithmetic logic unit (ALU) Objects 51, forward register (RFEG) objects 53, and backward register (BREG) Objects 55 to which vertical data and event bus lines 57 are connected. The ALU Objects 51 include ALUs 51$b$ and configuration registers 51$a$ temporarily storing the configuration bits transmitted to input ports, output ports, and the ALUs 51$b$.

The XPP processor 10 must passes through the configuration memory, the SCM 5, the CMs 40, the SMs 43, and the configuration registers 51$a$ to transmit the configuration bits from the configuration memory to the ALUs 51$b$ of the PAEs 50. Thus, the XPP processor 10 has a complicated structure. Also, the SCM 5, the CMs 40, the SMs 43, and the configuration registers 51$a$ require storage spaces which can store the configuration bits. As a result, hardware overheads occur. In addition, the structure of the XPP processor 10 is hierarchical. Thus, in a case where the number or the structure of the PAEs 50 is changed, the tree structure including the SCM 5, the CMs 40, the SMs 43, and the configuration registers 51$a$ must be modified. As a result, modification of the design of the tree structure is complicated, and thus its extension is diminished.

SUMMARY OF THE INVENTION

An aspect of the present general invention is to provide a loop accelerator simplifying a connection structure between a configuration memory and PEs so as to easily modify a structure thereof and save cost and a data processing system having the same.

According to an aspect of the present invention, there is provided a data processing system including a loop accelerator which processes a loop part of a program, a processor core which processes a remaining part of the program except the loop part processed by the loop accelerator, and a storage which transmits data between the processor core and the loop accelerator. The loop accelerator may include: a plurality of processing elements (PEs) each of which perform an operation on each word to process the program; a configuration memory storing configuration bits indicating configuration information of the PEs such as operations, actions, states, and the like; and a plurality of context memories installed in one of column and row directions of the PEs, wherein the plurality of context memories transmits the configuration bits provided from the configuration memory along a direction toward which the PEs are arrayed.

Each of the context memories may include a shift register which temporarily stores the configuration bits provided from the configuration memory; a counter which counts a number of configuration bits provided to the shift register; and a comparator which compares the number of configuration bits with a number of the PEs.

The shift register may include a plurality of storage spaces storing the configuration bits.

The shift register may synchronize with the clock signal to transmit the configuration bits to PEs closest to the shift register.

If one configuration bit is transmitted per one clock cycle and the number of configuration bits is one less than the number of the PEs, the shift register may stop transmitting the configuration bits.

The PEs may include storage spaces to transmit the configuration bits.

The PEs neighboring one another may be connected to wires in order to transmit the configuration bits.

The transmission of the configuration bits from the context memories to the PEs may be performed during executions of previous routines performed by the PEs.

If the PEs are arrayed in a row direction, the context memories may be arrayed along the row direction of the PEs. In this case, the number of context memories equals the number of rows of PEs. The configuration bits provided from the context memories may be transmitted to the PEs along the row direction of the PEs.

If the PEs are arrayed in a column direction, the context memories may be arrayed along the column direction of the PEs. In this case, the number of context memories equals the number of columns of PEs. The configuration bits provided from the context memories may be transmitted to the PEs along the column direction of the PEs.

According to another aspect of the present invention, there is provided a loop accelerator including a plurality of PEs each of which performs an operation on each word in order to process a program; a configuration memory which stores configuration bits indicating configuration information of the PEs, such as operations, actions, states, and the like; and a plurality of context memories installed in a column or row direction of the PEs, wherein the plurality of context memories transmits the configuration bits provided from the configuration memory along a direction toward which the PEs are arrayed.

BRIEF DESCRIPTION OF THE DRAWINGS

The above and other aspects of the present invention will be more apparent by describing certain embodiments of the present invention with reference to the accompanying drawings, in which.

DETAILED DESCRIPTION OF THE PREFERRED EMBODIMENTS

Figure 1:
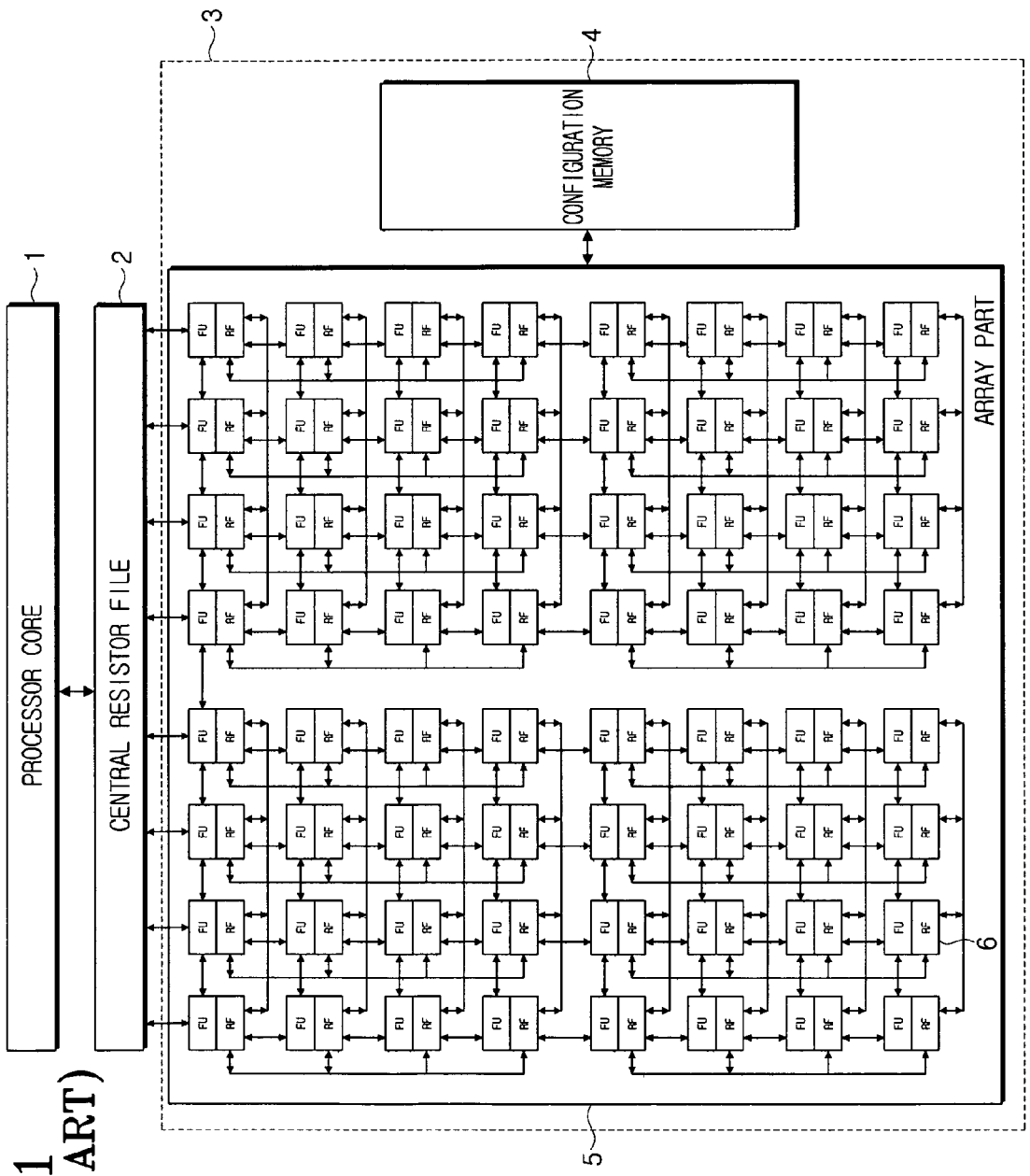
FIG. 1 is a view illustrating a configuration of a conventional data processing system.
Figure 2:
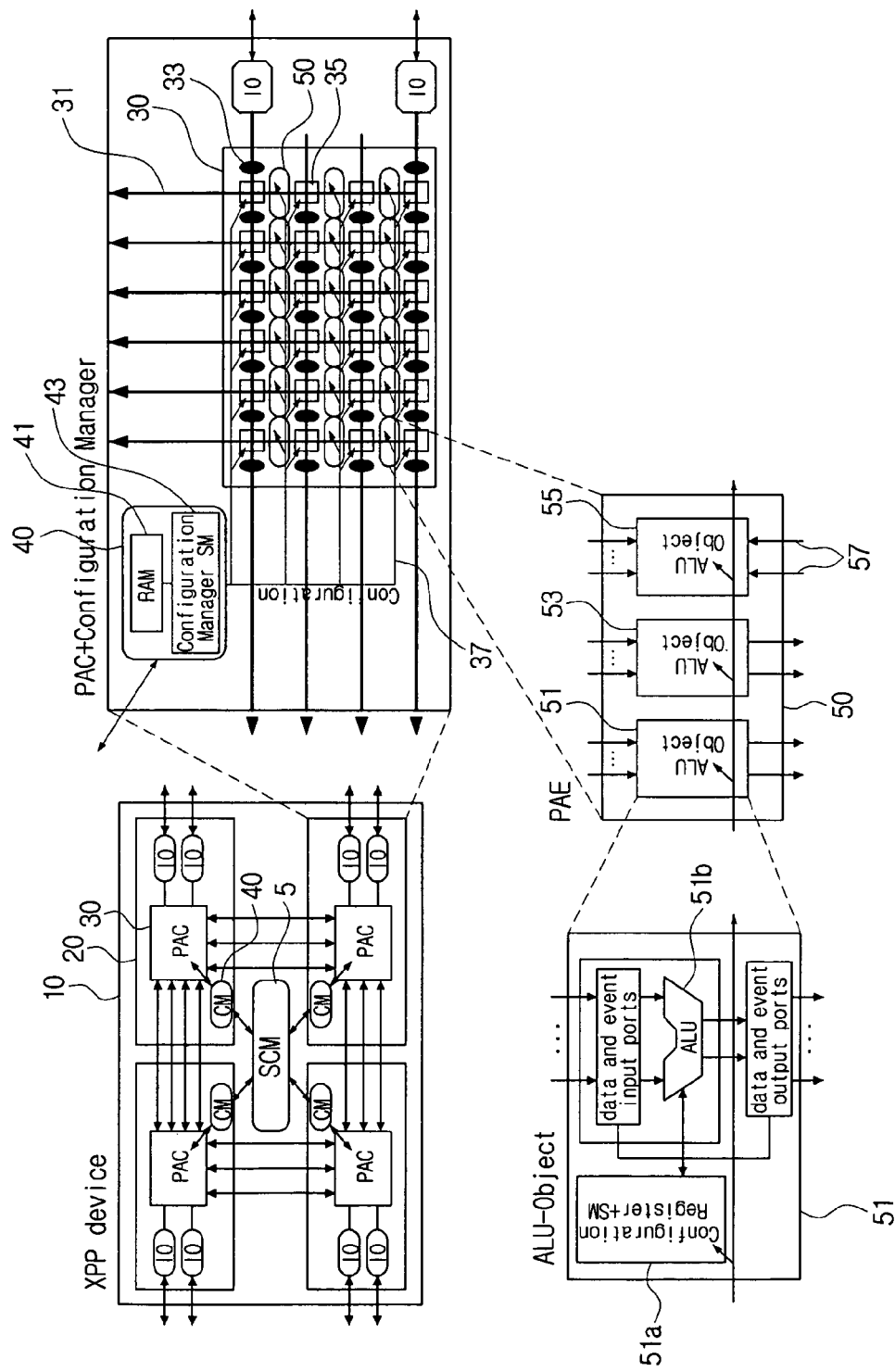
FIG. 2 is a view illustrating a configuration of a conventional XPP processor.

Certain embodiments of the present invention will be described in greater detail with reference to the accompanying drawings.

In the following description, the same drawing reference numerals are used for the same elements even in different drawings. The matters defined in the description such as a detailed construction and elements are provided to assist in a comprehensive understanding of the invention. However, the present invention can be carried out in other ways. Also, well-known functions or constructions are not described in detail since they would obscure the invention in unnecessary detail.

Figure 3A:
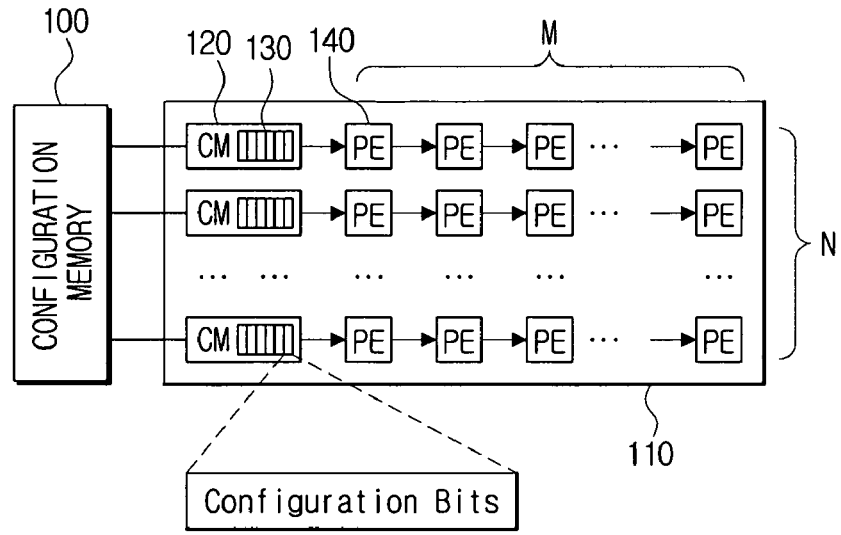
FIGS. 3A and 3B are views illustrating a configuration of a loop accelerator according to an embodiment of the present invention.
Figure 3B:
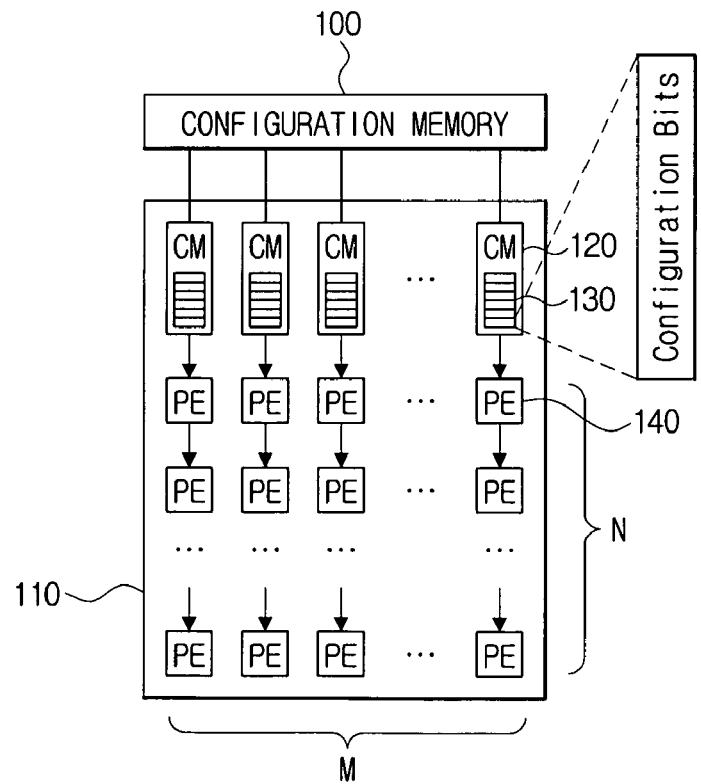

FIGS. 3A and 3B are views illustrating a configuration of a loop accelerator according to an embodiment of the present invention. Referring to FIGS. 3A and 3B, the loop accelerator includes a configuration memory 100 and an array part 110.

The configuration memory 100 stores configuration bits provided to a plurality of PEs 140 of the array part 110, and the configuration bits refer to bits indicating configuration information of the PEs 140, such as operations, actions, states, and the like. Examples of such bits include an OPCODE indicating a command, a control signal as an input of a multiplexer selecting a source operand, a control signal determining where output values are stored or routed, and the like.

The array part 110 includes the plurality of PEs 140 arrayed in a matrix and a plurality of context memories 120 providing the configuration bits from the configuration memory 100 to the PEs 140 in a row or column direction.

Each of the PEs 140 performs an operation on each word and includes a functional unit (FU) for processing data and a distributed register file (RF) storing operated values and the configuration bits. The PEs 140 include buffers or shift registers for transmitting the configuration bits to neighboring PEs 140.

The context memories 120 may be arrayed along a row direction of the PEs 140 in respective rows of the PEs 140 as shown in FIG. 3A or may be arrayed along a column direction of the PEs 140 in respective columns of the PEs 140 as shown in FIG. 3B.

The context memories 120 provide the configuration bits to the neighboring PEs 140 to transmit the configuration bits corresponding to the PEs 140 along the row or column direction of the PEs 140.

Figure 4:
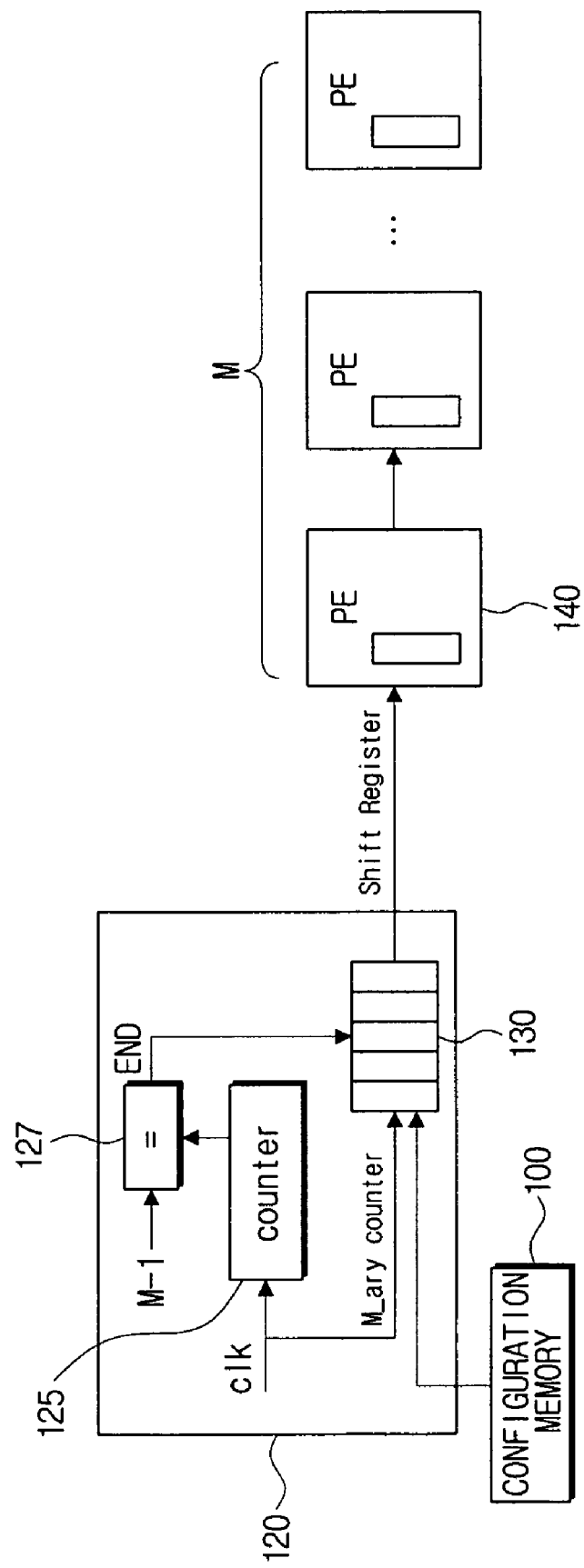
FIG. 4 is a view illustrating a detailed configuration of context memories shown in FIG. 3A.

FIG. 4 is a view illustrating a detailed configuration of the context memories 120 shown in FIG. 3A.

The context memories 120 include shift registers 130, counters 125, and comparators 127, are arrayed along a column of the array part 110, and transmit the configuration bits from the configuration memory 100 to the plurality of PEs 140 arrayed in the row direction.

The shift registers 130 temporarily store the configuration bits provided from the configuration memory 100 and each include a plurality queues so as to store a plurality of configuration bits. The shift registers 130 shift the configuration bits in a First-In First-Out (FIFO) manner, and a configuration bit is transmitted from the configuration memory 100 to the shift registers 130 per one clock cycle according to a clock signal.

The shift registers 130 transmit the configuration bits provided from the configuration memory 100 to PEs 140 closest to the context memories 120 according to the clock signal. The configuration bits transmitted to the PEs 140 closest to the context memories 120 are transmitted to next PEs 140 along the row or column direction according to the clock signal. The plurality of queues constitute each of the shift registers 130, and the number of queues is equal to or more than one and does not need to exceed a number of columns or rows.

The counters 125 count the number of input clock signals to count the number of configuration bits synchronizing with the clock signal to be provided from the configuration memory 100 to the shift registers 130.

If the counters 125 count the numbers of configuration bits from "0," the comparators 127 compare the numbers of configuration bits with a number one less than a number of PEs 140 constituting a row or column. For example, as shown in FIG. 4, the number of PEs 140 constituting the row is "M," and thus the comparators 127 compare the numbers of the configuration bits with "M−1." In a case where the context memories 120 are arrayed along a row direction of the array part 110 as shown in FIG. 3B, the comparators 127 compare the numbers of configuration bits with "N−1."

If the numbers of configuration bits are "M−1" or "N−1," the comparators 127 provide the comparison results to the shift registers 130 so as not to provide the configuration bits to the PEs 140 anymore. This allows all configuration bits corresponding to M or N PEs 140 to be provided.

The context memories 120 may be arrayed in a column direction or a row direction of the array part 110. The context memories 120 may be arrayed along a direction toward which the PEs 140 are shorter in order to reduce a number of the context memories 120. Alternatively, the context memories 120 may be arrayed along a direction toward which the PEs 140 are longer in order to reduce a time required for setting the configuration bits.

A process of setting configuration bits in the loop accelerator having the above-described structure will now be described.

The configuration bits provided from the configuration memory 100 are transmitted to the shift registers 130 of the context memories 120 arrayed in the row or column direction of the array part 110. If the configuration bits are input to the shift registers 130, the shift registers 130 operate according to the clock signal to transmit the configuration bits to PEs 140 at the closest distances from the shift registers 130. The PEs 140 at the closest distances from the shift registers 130 transmit the configuration bits to next PEs 140 according to the clock signal. The transmission of the configuration bits continues until the configuration bits are transmitted to the last one of the PEs 140.

The counters 125 begin counting the numbers of configuration bits when the configuration bits are first input to the shift registers 130. The comparators 127 compare the numbers of configuration bits with the number one less than the number of the PEs 140 arrayed in the row or column direction and transmit the comparison results to the shift registers 130 in order to transmit the corresponding configuration bits to all of the PEs 140. If the numbers of configuration bits are equal to the number one less than the number of the PEs 140 arrayed in the row or column direction, the shift registers 130 stop transmitting the configuration bits.

In a case where the configuration bits are transmitted from the configuration memory 100 to the PEs 140, a time required for transmitting the configuration bits to the PE 140 in the last position of a row or column may be increased. However, when the array part 110 executes an arbitrary routine during execution of a program, configuration bits for a next routine may be pre-transmitted from the configuration memory 100 to the PEs 140 to be set so as to reduce a time required for setting the configuration bits. For this purpose, the PEs 140 require spaces for storing configuration bits of next routines. Distributed register files or buffers of the PEs 140 may be used as the storage spaces.

As described above, in a case where a loop accelerator according to the present invention transmits configuration bits from a configuration memory to PEs through context memories, a plurality of wires do not need to be installed to connect the configuration memory to the PEs. Thus, the configuration memory does not need to include ports connected to the PEs. As a result, the accelerator can have a simple structure and be easily manufactured.

In addition, the wires do not need to be long to connect the PEs at long distances from the configuration memory to the configuration memory. Moreover, the wires connecting the PEs can be short. Thus, the lengths of the wires can be minimized in order to prevent increased cost and overhead caused by the long lengths of the wires. In a case where the wires are short, a cycle of a clock signal determined depending on the lengths of the wires can be short. Thus, a speed of transmitting the configuration bits can be improved. Also, a structure of an array part can be easily modified in terms of design due to a simple connection structure between the configuration memory and the PEs. Thus, the array part can be extended.

As a result, power consumption can be reduced for connections between the configuration memory and the PEs and among the PEs. Thus, the loop accelerator is suitable for nano environments. Also, in a case where a size of the array part is increased, the loop accelerator can be further effectively used.

The foregoing embodiment and features are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A data processing system comprising a loop accelerator which processes a loop part of a program, a processor core which processes a remaining part of the program except the loop part, and a storage which transmits data between the processor core and the loop accelerator,
  wherein the loop accelerator comprises:
    a plurality of processing elements (PEs), each of which performs an operation on each word to process the program;
    a configuration memory which stores configuration bits indicating configuration information of the PEs; and
    a plurality of context memories installed in one of column and row directions of the PEs, wherein the plurality of context memories transmits the configuration bits provided from the configuration memory along a direction toward which the PEs are arrayed,
  wherein each of the context memories comprises:
    a shift register which temporarily stores the configuration bits provided from the configuration memory;
    a counter which counts a number of configuration bits provided to the shift register; and
    a comparator which compares the number of configuration bits with a number of the PEs.

2. The data processing system of claim 1, wherein the shift register comprises a plurality of storage spaces which store the configuration bits.

3. The data processing system of claim 2, wherein the shift register synchronizes with a clock signal to transmit the configuration bits to PEs closest to the shift register.

4. The data processing system of claim 3, wherein if one configuration bit is transmitted per one clock cycle and the number of configuration bits is one less than the number of the PEs, the shift register stops transmitting the configuration bits.

5. The data processing system of claim 4, wherein the PEs comprise storage spaces to transmit the configuration bits.

6. The data processing system of claim 5, wherein the PEs neighboring one another are connected to wires in order to transmit the configuration bits.

7. The data processing system of claim 6, wherein the transmission of the configuration bits from the context memories to the PEs is performed during executions of previous routines performed by the PEs.

8. The data processing system of claim 7, wherein if the PEs are arrayed in a row direction, the context memories are arrayed along the row direction of the PEs.

9. The data processing system of claim 8, wherein the number of context memories is equal to the number of rows of PEs.

10. The data processing system of claim 9, wherein the configuration bits provided from the context memories are transmitted to the PEs along the row direction of the PEs.

11. The data processing system of claim 7, wherein if the PEs are arrayed in a column direction, the context memories are arrayed along the column direction of the PEs.

12. The data processing system of claim 11, wherein the number of context memories is equal to the number of columns of PEs.

13. The data processing system of claim 11, wherein the configuration bits provided from the context memories are transmitted to the PEs along the column direction of the PEs.

* * * * *